(12) United States Patent
Spieth et al.

(10) Patent No.: US 10,473,085 B2
(45) Date of Patent: Nov. 12, 2019

(54) WIND TURBINE ROTOR BLADE TRAILING EDGE SEGMENT

(71) Applicant: WOBBEN PROPERTIES GMBH, Aurich (DE)

(72) Inventors: Falk Spieth, Aurich (DE); Florian Rubner, Aurich (DE); Christoph Wenk, Hage (DE)

(73) Assignee: Wobben Properties GmbH, Aurich (DE)

( * ) Notice: Subject to any disclaimer, the term of this patent is extended or adjusted under 35 U.S.C. 154(b) by 349 days.

(21) Appl. No.: 15/327,994

(22) PCT Filed: Jul. 8, 2015

(86) PCT No.: PCT/EP2015/065566
§ 371 (c)(1),
(2) Date: Jan. 20, 2017

(87) PCT Pub. No.: WO2016/012239
PCT Pub. Date: Jan. 28, 2016

(65) Prior Publication Data
US 2017/0159642 A1    Jun. 8, 2017

(30) Foreign Application Priority Data
Jul. 22, 2014   (DE) ................. 10 2014 214 220

(51) Int. Cl.
*F03D 1/06*       (2006.01)
*F03D 13/40*      (2016.01)

(52) U.S. Cl.
CPC ......... *F03D 1/0641* (2013.01); *F03D 1/0675* (2013.01); *F03D 1/0683* (2013.01);
(Continued)

(58) Field of Classification Search
CPC .... F03D 1/0641; F03D 1/0675; F03D 1/0683; F03D 13/40; Y02P 70/523;
(Continued)

(56) References Cited

U.S. PATENT DOCUMENTS

| 8,192,170 B2 | 6/2012 | Rohden |
| 2003/0175121 A1* | 9/2003 | Shibata ................. F03D 1/0641 416/131 |

(Continued)

FOREIGN PATENT DOCUMENTS

| DE | 102006022279 A1 | 11/2007 |
| DE | 202011103091 U1 | 1/2012 |

(Continued)

*Primary Examiner* — Christopher Verdier
*Assistant Examiner* — Elton K Wong
(74) *Attorney, Agent, or Firm* — Seed Intellectual Property Law Group LLP

(57) ABSTRACT

A trailing-edge segment of a wind-turbine rotor blade for increasing a profile depth of the rotor blade of a wind turbine. The trailing-edge segment of a wind-turbine rotor blade comprises at least one inner blade segment, having an inner blade shell, at least one middle blade segment, having a middle blade shell. In this case, the at least one middle blade segment and the at least one inner blade segment can be coupled to each other via a coupling means, and the coupling means has at least one shell element, having two inner sides that are parallel to each other and form a receiving space, designed to receive at least one of the inner blade shell or middle blade shell, and the two inner sides each being realized such that they can be connected to at least one of the inner blade shell or middle blade shell, in such a manner that a force acting upon the trailing-edge segment of a wind-turbine rotor blade is introduced centrically into the coupling means.

15 Claims, 6 Drawing Sheets

(52) U.S. Cl.
CPC .......... *F03D 13/40* (2016.05); *F05B 2230/60* (2013.01); *F05B 2240/301* (2013.01); *F05B 2240/302* (2013.01); *F05B 2260/30* (2013.01); *Y02E 10/721* (2013.01); *Y02P 70/523* (2015.11)

(58) Field of Classification Search
CPC .......... F05B 2240/301; F05B 2240/302; F05B 2230/60; Y02E 10/721
See application file for complete search history.

(56) References Cited

U.S. PATENT DOCUMENTS

| | | | |
|---|---|---|---|
| 2009/0311106 A1* | 12/2009 | Rohden | F03D 1/0675 416/241 A |
| 2010/0028161 A1* | 2/2010 | Vronsky | F03D 1/0641 416/238 |
| 2012/0141272 A1* | 6/2012 | Wilson | F03D 1/0641 416/23 |
| 2013/0209264 A1 | 8/2013 | Mashue et al. | |
| 2014/0328691 A1* | 11/2014 | Hoffmann | F03D 1/0675 416/230 |

FOREIGN PATENT DOCUMENTS

| | | |
|---|---|---|
| DE | 102012209935 A1 | 6/2013 |
| DE | 102013101232 A1 | 8/2013 |
| JP | 2012-225180 A | 11/2012 |
| WO | 2013083481 A1 | 6/2013 |

\* cited by examiner

WIND TURBINE ROTOR BLADE TRAILING EDGE SEGMENT

BACKGROUND

Technical Field

The invention relates to a trailing-edge segment for increasing a profile depth of a rotor blade of wind turbine, to a rotor blade, and to a wind turbine. The invention additionally relates to a coupling means.

Description of the Related Art

Wind turbines are known in general. The design of the rotor blade, or rotor blades, is an important aspect for the efficiency of the wind turbine. One possibility for making such a rotor blade more powerful and efficient is the body of the rotor blade. Particularly in the region of the rotor-blade root, i.e., in the region at which the rotor blade is attached to the hub, it is useful to design the rotor blade with a large profile depth. The maximum profile depth of the rotor blade, i.e., the length of the rotor blade between the trailing edge and the nose of the rotor blade, has its maximum value very close to the end region of the rotor blade, on the hub side of the rotor. Such an increase in the profile depth in the region of the rotor-blade root can reduce vortex formation at this location, and thus results in an increase in the efficiency of the wind turbine.

Particularly in the case of larger wind turbines, having rotor blades greater than 80 meters, such an increase in the profile depth of the rotor blade may result in problems in transporting the rotor blades. Such rotor blades may have a maximum profile depth of 5 meters or more. During transport, for example over land, it therefore becomes difficult, or in some cases impossible, to pass under a bridge with such a rotor blade. It is therefore sometimes necessary to accept diversions, such that transport is only possible with a very large resource deployment.

To solve this problem, it is already known to produce a rotor blade having a separate trailing-edge segment that is attached to the rotor blade only when in situ, i.e., at the wind-turbine installation site. The height of the rotor blade can thus be reduced substantially for transport, thereby also reducing the logistical resources deployed in transport. Frequently, however, attaching such known trailing-edge segments to the rotor blade is complicated. In particular, it is often complicated to attach the trailing-edge segment at the wind-turbine installation site, assembling is resource-intensive, and consequently construction of the entire wind turbine in situ requires a large expenditure of time.

To solve this problem, the document DE 10 2012 209 935 A1 has already disclosed a rear casing for a rotor blade, having a top segment and a bottom segment. The top segment and the bottom segment in this case can be coupled to each other. What is problematic in this case is that, in some instances, it is not possible to adhere to a necessary exact production. Moreover, in the case of such a connection, the introduction of force is one-sided, with the result that a moment acts upon the connecting element. Since the rotor blade is subjected to large loads precisely in the region of the rotor-blade root, in strong wind the action of this moment can result in damage to the connection.

In the priority-establishing German patent application, the German Patent and Trade Marks Office searched the following documents: DE 10 2012 209 935 A1, DE 10 2006 022 279 A1, DE 20 2011 103 091 U1 and DE 10 2013 101 232 A1.

BRIEF SUMMARY

There is proposed a trailing-edge segment of a wind-turbine rotor blade for increasing a profile depth of a rotor blade of a wind turbine. The trailing-edge segment in this case comprises at least one inner blade segment, having an inner blade shell, and at least one middle blade segment, having a middle blade shell. The middle blade segment and the at least one inner blade segment in this case can be coupled to each other via a coupling means, and the coupling means has at least one shell element, having two inner sides that are parallel to each other and realized to form a receiving space for receiving at least one of the inner blade shell or middle blade shell. The two inner sides are each realized such that they can be connected to at least one of the inner blade shell or middle blade shell, in such a manner that a force acting upon the trailing-edge segment is introduced centrically into the coupling means.

A trailing-edge segment increases the profile depth in such a manner that disturbing vortices in the region of the rotor-blade root can be reduced, or even avoided. The trailing-edge segment in this case is divided into at least two sub-segments, namely, the inner blade segment and the middle blade segment. The middle blade segment preferably has a connecting side for connecting to an outer blade segment, which extends over the entire length of the rotor blade. It is provided, at least partially, between the outer blade segment and the inner blade segment. An inner blade segment in the present case is to be understood to mean a segment that comprises the trailing edge of the rotor blade. The nose of the rotor blade is provided on the outer blade segment. In particular, the trailing-edge segment may comprise a plurality of inner blade segments, i.e., more than one, preferably two or three inner blade segments. These can be coupled to a single middle blade segment or to a plurality of middle blade segments, in particular two or three middle blade segments. The inner blade segment and the middle blade segment in this case are disposed, in particular, in the lower region of the rotor blade, i.e., in the region close to the root of the rotor blade. In particular, in this case they do not extend over the entire length of the rotor blade.

The middle blade segment and the inner blade segment can be coupled to each other via a coupling means, i.e., they are connected to each other by the coupling means. Such a coupling means has at least one shell element. The shell element has two inner sides, which are parallel to each other and which has a receiving space for receiving the inner blade shell and/or middle blade shell. The inner blade shell and/or middle blade shell in this case are/is arranged, in particular, inside the trailing-edge segment, such that the aerodynamic behavior of the rotor blade is not disturbed by the coupling means. The receiving space is matched, in particular, to the thickness of the inner blade shell and/or middle blade shell, such that the inner blade shell and/or middle blade shell can be inserted in the receiving space. The inner blade shell and/or middle blade shell can then be connected to the two inner sides of the shell element of the coupling means. In particular, the shell element and the inner blade shell and/or middle blade shell are glued to the shell element of the coupling means. Accordingly, the inner blade shell and/or middle blade shell can be connected by two sides, in particular by both outer sides, i.e., on both sides, to the two inner sides of the shell element. A force acting upon the rotor blade, and consequently also upon the trailing-edge segment, is thereby introduced uniformly into the coupling means via two sides, and is introduced centrically into the coupling means, at an end at which the two inner sides converge. This avoids the creation of moments as load is introduced into the coupling means. The risk of damage to the coupling means is reduced.

In this case, advantageously, the middle blade segment may be already attached to the outer blade segment in the production hall. Then, when a wind turbine is being erected, the inner blade segment only has to be coupled to the middle blade segment. As a result, the amount of assembly work at the wind turbine installation site is reduced.

Preferably, the at least one shell element has a recess for receiving a first coupling element. The first coupling element is thus produced separately from the shell element, i.e., as a single element. It is thereby ensured that the individual elements of the coupling means are produced with precision. Production tolerances can be observed without difficulty. In this case, in particular, the first coupling element is produced for precise fitting with the shell element, such that it can be inserted in the shell element.

In a preferred embodiment, the first coupling element has an opening for receiving a second coupling element, for the purpose of producing the coupling of the inner blade segment to the middle blade segment. The second coupling element in this case is inserted in the opening of the first coupling element. In particular, the second coupling element is provided without play in the first coupling element. The second coupling element in this case connects, in particular, a first coupling element that is disposed on an inner blade shell to a first coupling element that is disposed on a middle blade shell. The second coupling element thereby connects the inner blade segment to the middle blade segment. Alternatively, a shell element having a first coupling element is provided only on the inner blade shell or only on the middle blade shell. The second coupling element is then inserted in the opening of the first coupling element and disposed on the middle blade shell or inner blade shell. In the case of a plurality of shell elements, the first coupling elements are disposed in relation to each other in such a manner that a second coupling element of an inner blade shell adjoins a first coupling element of a middle blade shell, which, in turn, adjoins a first coupling element of a, or the, inner blade shell, etc. The second coupling element in this case is routed through the respective opening of each first coupling element. The individual shell elements, and consequently the inner blade segment, are thereby coupled to the middle blade segment.

In a particularly preferred embodiment, the first coupling element is produced from plastic, and in particular the first coupling element is realized as an injection molded part. Moreover, the injection molded parts can be produced inexpensively in large quantities. A corresponding dimensional accuracy is achieved.

Preferably, the first coupling element is latched into the recess of the at least one shell element. The first coupling element thus slides into the recess of the at least one shell element, where it then engages, or snaps in. This happens because the first coupling element, upon reaching the recess, moves automatically back into its initial position as a result of the diminishing force, before being inserted in the shell element. As a result, a sound is produced. It is advantageous in this case that the sound signals the fixing of the connection. Moreover, a connection between the first coupling element and the shell element is produced without additional connecting means, such that the amount of assembly work required remains small.

In a preferred embodiment, the first coupling element has at least one indentation for receiving a sealing element. In this case, the sealing element is provided between the first coupling element and at least one of the inner blade shell or the middle blade shell. In this case, such a sealing element is inserted in the indentation of the first coupling element and thus sits fixedly therein. Moreover, it is centered by the predefined indentation, and is consequently disposed at the correct location. The sealing element prevents, for example, adhesive, by which the shell element and the inner blade shell and/or middle blade shell are connected, from running into the recess of the shell element. Moreover, such a sealing element is realized, in particular, as a single piece and consequently, in particular in the case of a plurality of shell elements, it is provided amongst all shell elements. The individual shell elements are thereby held together and centered.

In a particularly preferred embodiment, the second coupling element is realized as an elongate body, which can be inserted in the respective opening of a plurality of first coupling elements, such that the inner blade shell can be coupled to the middle blade shell. In this case, the elongate body is realized, in particular, in the manner of a rod. It has the shape of the opening, such that it can be inserted therein without play. The plurality of first coupling elements in this case are disposed in the first shell elements. The first shell elements in this case are preferably disposed alternately on the inner blade shell and the middle blade shell. A hinge-type connection is thereby produced between the inner blade shell and the middle blade shell.

Preferably, the shell element is produced from a fibrous composite material, in particular a glass-fiber-reinforced plastic. This is because glass fibers have a low modulus of elasticity, i.e., the structure is able undergo large linear elastic deformation. Consequently, a shell element made of glass-fiber-reinforced plastic is particularly well suited for receiving the inner blade shell and/or middle blade shell, and for receiving the second coupling element.

In a preferred embodiment, the shell element is realized in the shape of a U and/or as a parallel loop. The inner blade shell and/or middle blade shell are/is then received between the two parallel inner sides. The recess for receiving the first coupling element is provided in the circular portion. A parallel loop additionally has the advantage, e.g., as compared with an eye loop, that no unfavorable opening stresses are produced at the lateral regions. It is thus possible for the shell element to be attached to the inner blade shell and/or middle blade shell in a stable manner.

In a particularly preferred embodiment, the at least one inner blade segment and the at least one middle blade segment can be coupled to each other in a form-fitting manner.

Preferably, the first coupling element has a flange at at least one opening. In this case, the flange of an inner blade segment that is coupled to a middle blade segment bears against a flange of the first coupling element of the middle blade segment. The same also applies conversely. The flange forms an outer rim around the opening, its diameter being greater than the diameter of the respective opening. After the first coupling element has latched into the shell element, therefore, the flange is located, in the region of the opening, in front of the shell element, or in the case of producing a coupling, between the individual shell elements. As a result, only the flanges bear against each other. This is particularly advantageous if the flange, or the first coupling element, is produced from plastic. Then, plastic bears against plastic. There is little abrasive wear in this case.

Additionally proposed is a rotor blade of a wind turbine. The rotor blade in this case comprises at least one outer blade segment, which extends over the entire length of the rotor blade, and at least one trailing-edge segment according to any one of the aforementioned embodiments, which can be connected to the outer blade segment. Consequently, the advantages already mentioned above ensue in equal measure for the trailing-edge segment.

In this case, such a rotor blade can be used with wind turbines of all output classes, in particular in output classes in the megawatt range, for wind turbines having rotor diameters that are greater than 80 meters.

Preferably in this case, the trailing-edge segment comprises an inner blade segment and a middle blade segment. The middle blade segment is connected to the outer blade segment via a connecting side, and is connected to the inner blade segment via a coupling means. In this case, in particular, the middle blade segment can already be connected to the outer blade segment in the production hall, without logistical problems occurring during transport. The inner blade segment can then be transported separately to the installation site of the wind turbine, and attached in situ. This reduces the amount of assembly work at the installation site, and thus reduces the time for installation of the wind turbine.

Also proposed is a wind turbine. The wind turbine in this case comprises a tower, a nacelle and a rotor. In this case, at least one rotor blade according to any one of the aforementioned embodiments is provided on the rotor. The aforementioned advantages thus also ensue for the wind turbine.

Additionally proposed is a coupling means for coupling at least one inner blade segment of a trailing-edge segment of a rotor blade of a wind turbine to at least one middle blade segment of a trailing-edge segment of a rotor blade of a wind turbine. The coupling means in this case comprises at least two shell elements having a recess. In this case, a first shell element can be connected to an inner blade shell of the at least one inner blade segment, and a second shell element can be connected to a middle blade shell of the at least one middle blade segment, and each shell element has, respectively, a first coupling element for inserting in the recess having an opening, and a second coupling element for inserting in the respective openings of the respectively first coupling element, such that the at least one inner blade segment and the at least one middle blade segment can be coupled to each other. The two shell elements in this case each have two inner sides, which are parallel to each other and which are each prepared to introduce centrically into the coupling means a force acting upon the trailing-edge segment.

It is particularly advantageous in this case that the individual elements of the coupling means can be produced separately from each other, and predefined production tolerances can thus be observed. Moreover, damage to the coupling means, caused by the occurrence of moments upon introduction of load, is avoided.

BRIEF DESCRIPTION OF THE SEVERAL VIEWS OF THE DRAWINGS

The invention is explained exemplarily in greater detail in the following, on the basis of exemplary embodiments and with reference to the accompanying figures.

DETAILED DESCRIPTION

The invention is explained in a substantially schematic manner on the basis of examples and with reference to the figures, and the elements explained in the respective figure may be exaggerated therein to aid illustration, and other elements may be simplified. Thus, for example, a wind turbine is illustrated schematically as such in FIG. 1, such that the provided trailing-edge segment on the rotor blade cannot be seen in detail.

Figure 1:
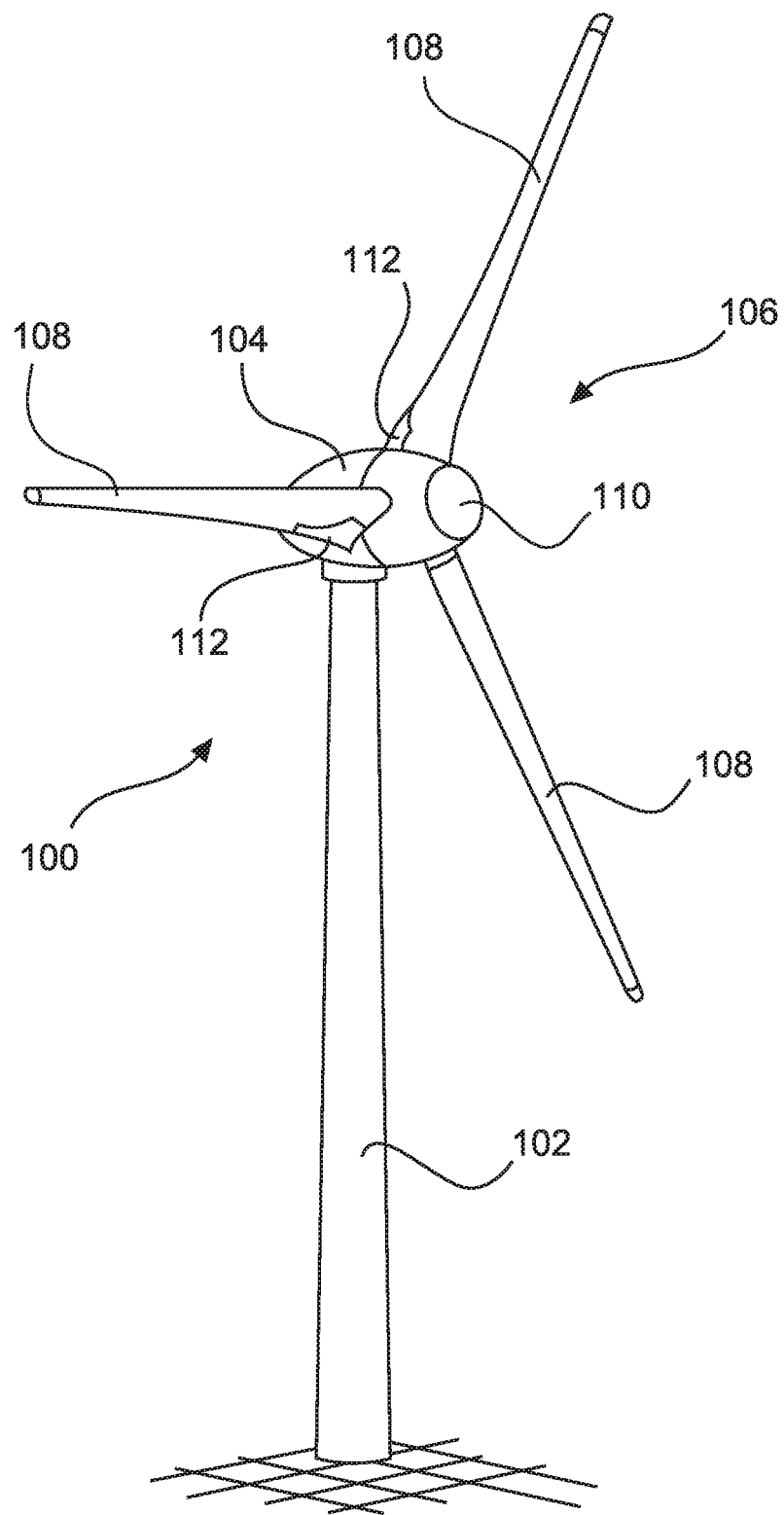
FIG. 1 shows a wind turbine according to the present invention.

FIG. 1 shows a wind turbine 100 having a tower 102 and a nacelle 104. A rotor 106, having three rotor blades 108 and a spinner 110, is disposed on the nacelle 104. When in operation, the rotor 106 is put into a rotary motion by the wind, and thereby drives a generator (not represented) in the nacelle 104.

The rotor blades 108 each have a trailing-edge segment 112, by means of which they are realized as close-fitting rotor blades. The trailing-edge segment 112 in this case can be divided into a plurality of segments, as can be seen from the following FIG. 2.

Figure 2:
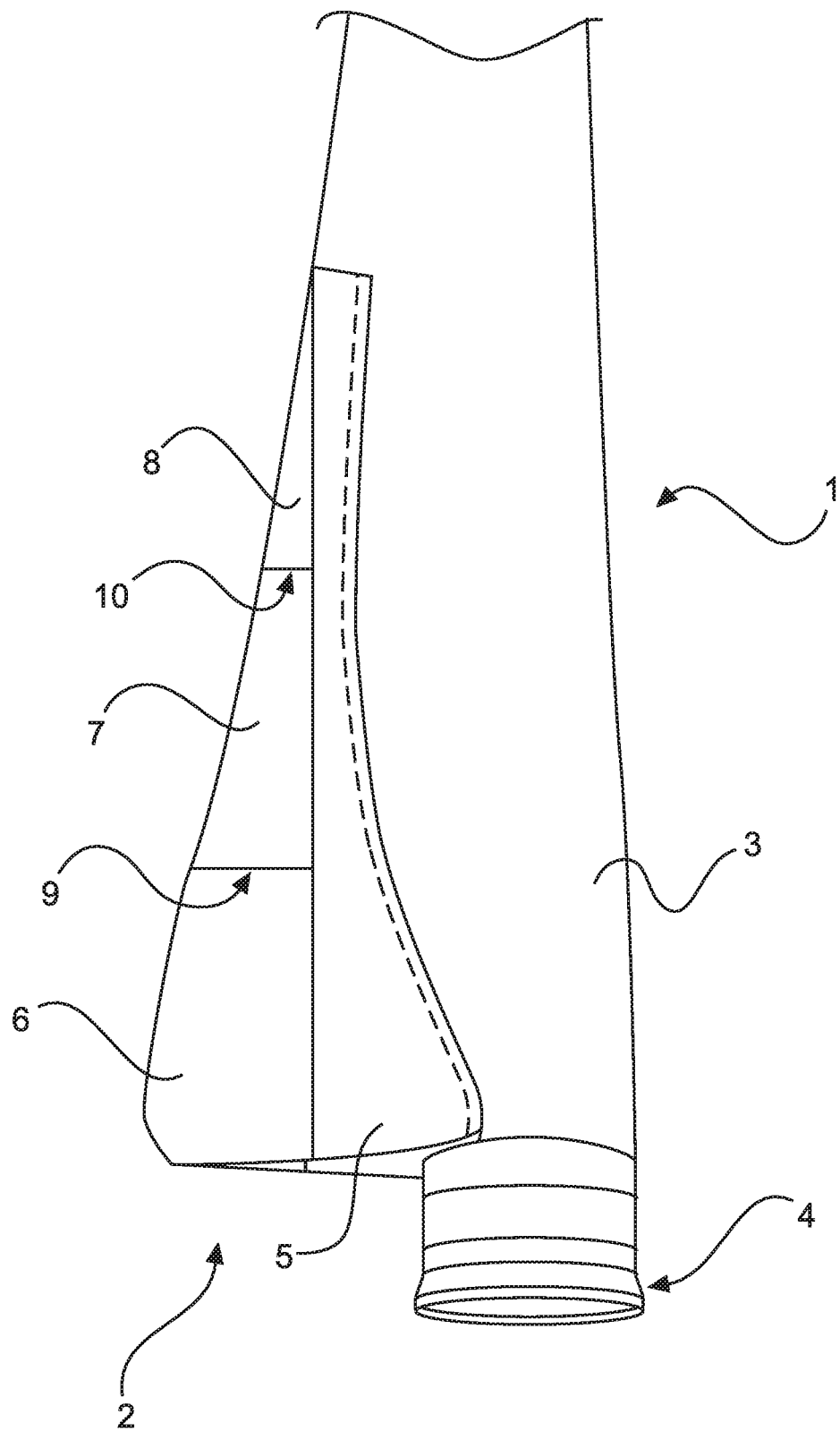
FIG. 2 shows a detail of a rotor blade with a trailing-edge segment according to an exemplary embodiment of the invention.

FIG. 2 shows a detail of a wind-turbine rotor blade 1, which has an outer blade segment 3, as well as a trailing-edge segment 2 and a rotor-blade root 4. It can be seen that the rotor blade 1 has the greatest profile depth in the region of the rotor-blade root 4. The rotor blade 1 from FIG. 2 can correspond to the rotor blade 108 according to FIG. 1.

The trailing-edge segment 2 is divided into a middle blade segment 5 and three inner blade segments 6, 7 and 8. The inner blade segments 6, 7 and 8 are connected to the middle blade segment 5. The middle blade segment 5, in turn, is connected to the outer blade segment 3. The inner blade segments 6, 7 and 8 are disposed adjacently to each other, and bear against each other at division planes 9, 10. This forms the trailing edge of the rotor blade 1. Alternatively, the inner blade segment may also be realized as one piece, or be composed of two to five segments. Such a rotor blade 1 in this case has the advantage that the middle blade segment can be attached directly to the outer blade segment during production, for example, and consequently less assembly work is required in situ, and the wind turbine can be erected more rapidly at its installation site. Nevertheless, the rotor blade 1 is still advantageous for transport. In comparison with a fully assembled rotor blade, the logistical resource requirement is reduced.

Figure 3:
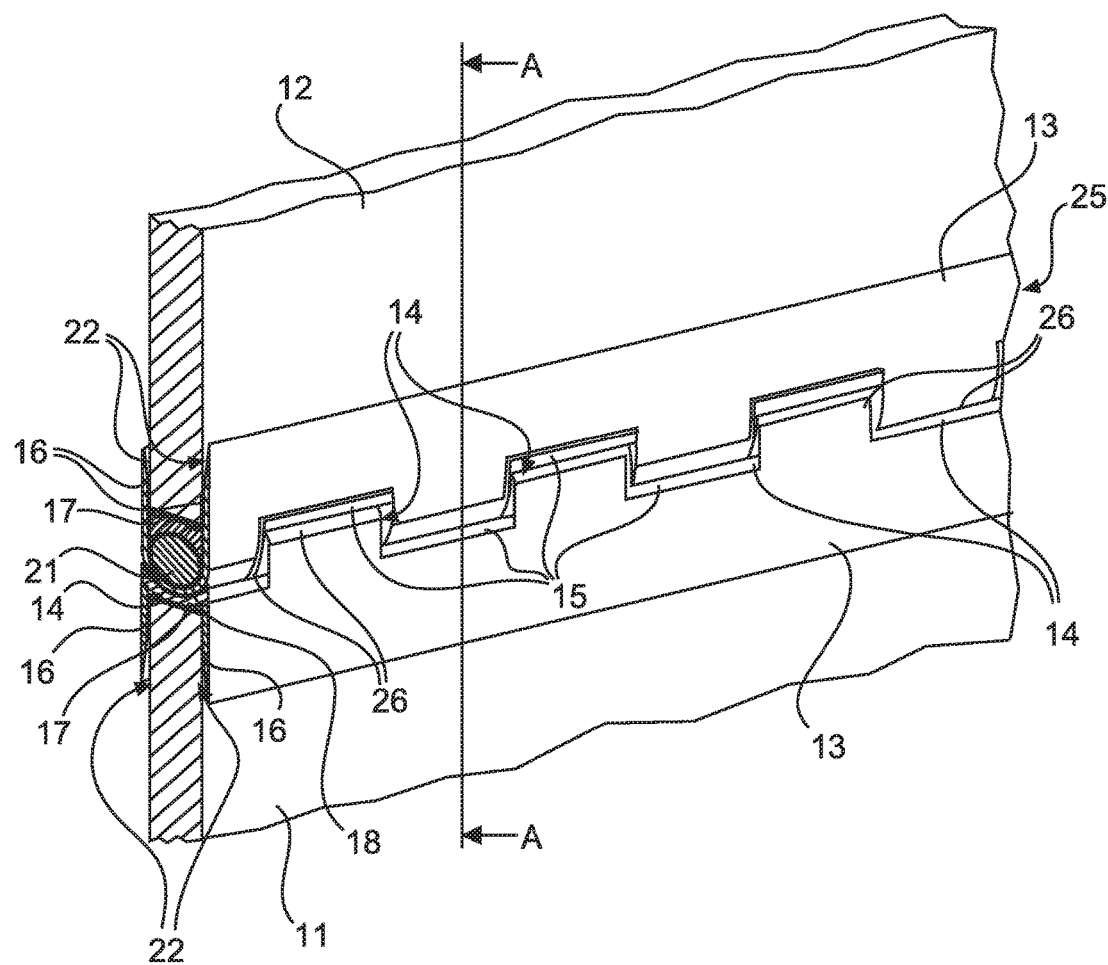
FIG. 3 shows a detail view of the trailing-edge segment according to FIG. 2.

The coupling of each of the inner blade segments 6, 7 and 8 to the middle blade segment 5 to form a trailing-edge segment 2 is shown in FIG. 3. As can be seen in FIG. 3, the middle blade segment has a middle blade shell 11, and the inner blade segment has an inner blade shell 12. The middle blade shell 11 and the inner blade shell 12 are coupled via a coupling means 25. A respective shell element 13 is provided on the middle blade shell 11 and on the inner blade shell 12. The shell element 13 encloses the middle blade shell 11 or the inner blade shell 12. The respective shell elements 13 are realized as a parallel loop, and therefore each have two inner sides 22, which are parallel to each other, and between which the middle blade shell 11, or the inner blade shell 12, is provided. The inner sides 22 that are parallel to each other converge in a round portion 26. The respective shell element 13 has a plurality of recesses 14, in which, respectively, a first coupling element 15 is provided. In the recess 14, the first coupling element 15 has a semicircular shape, which matches the round portion 26 of the respectively opposite shell element 13 that is seated in this round shape. An adhesive 16 is provided between the respective inner sides 22 and the middle blade shell 11, or the inner blade shell 12, in order to produce a two-sided connection of the middle blade shell 11, or inner blade shell 12, to the coupling means 25. The respective shell element 13 is thus fixedly seated on the middle blade shell 11, or on the inner blade shell 12.

The first coupling element 15 in this case is latched into the recess 14 of the shell element 13. The first coupling element 15 has a circular opening 18, in which a round, elongate rod 21, as an exemplary embodiment of a second coupling element, is inserted. The second coupling element 21 in this case extends through the entire first coupling element 15, such that the middle blade shell 11 is connected to the inner blade shell 12. A seal 17 is provided, respectively, between the first coupling element 15 and the middle blade shell 11, or the inner blade shell 12. The seal 17 enables the plurality of first coupling elements 15 to be held together and centered. Moreover, the adhesive 16 is prevented, for example, from running into the recess 14 of the shell element.

Figure 4:
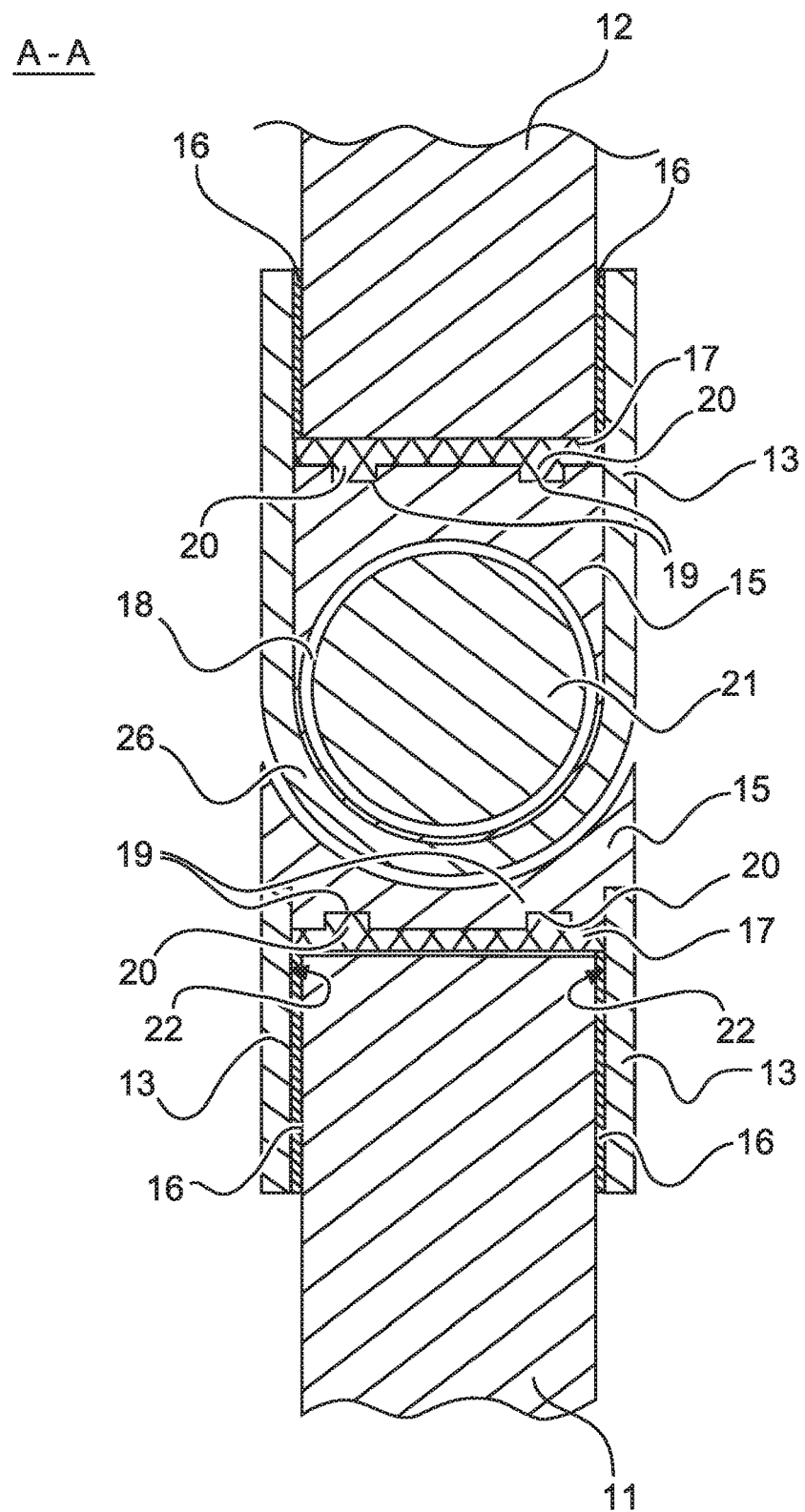
FIG. 4 shows a sectional view of FIG. 3.

FIG. 4 shows a section A-A of FIG. 3. FIG. 4 in this case shows the inner blade shell 12, which is enclosed by the shell element 13, realized in the shape of a U, or as a parallel loop. The middle blade shell 11 receives the round portion 26 of the first coupling element 15, in the first coupling element 15 disposed in the recess 14. The U-shaped shell element 13 is connected to the blade shell 12 on two sides, via an adhesive 16. This two-sided connection provides for a centered introduction of load. A moment resulting from a one-sided introduction of load is avoided. A first coupling element 15 is disposed within the U-shaped blade shell 13. The first coupling element 15 in this case is preferably produced from a plastic, and has an opening 18. In addition, the first coupling element 15 has two indentations 19, in which, respectively, a lip 20 of a seal 17 is inserted. The seal 17 in this case is disposed between the blade shell 12 and the first coupling element 15. This prevents the adhesive or anything else from getting into the coupling region. Moreover, the seal 17 can be used to stabilize, or position, the individual first coupling elements 15. In this case, a plurality of first coupling elements 15, which can be brought into the correct position by a continuous seal 17, are provided over the longitudinal axis of a rotor blade.

A rod-like second coupling element 21, which connects the various first coupling elements, and thus the middle blade shell 11 and the inner blade shell 12 of the middle blade segment 5, or of the inner blade segment 6, 7, 8, to each other, is inserted in the opening 18. The rod-like coupling 21 is matched to the shape of the opening 18. In FIG. 4, accordingly, a tubular, or round, rod-like second coupling element 21 is used. The second coupling element 21 in this case is preferably inserted, or introduced, into the opening 18 without play.

Figure 5:
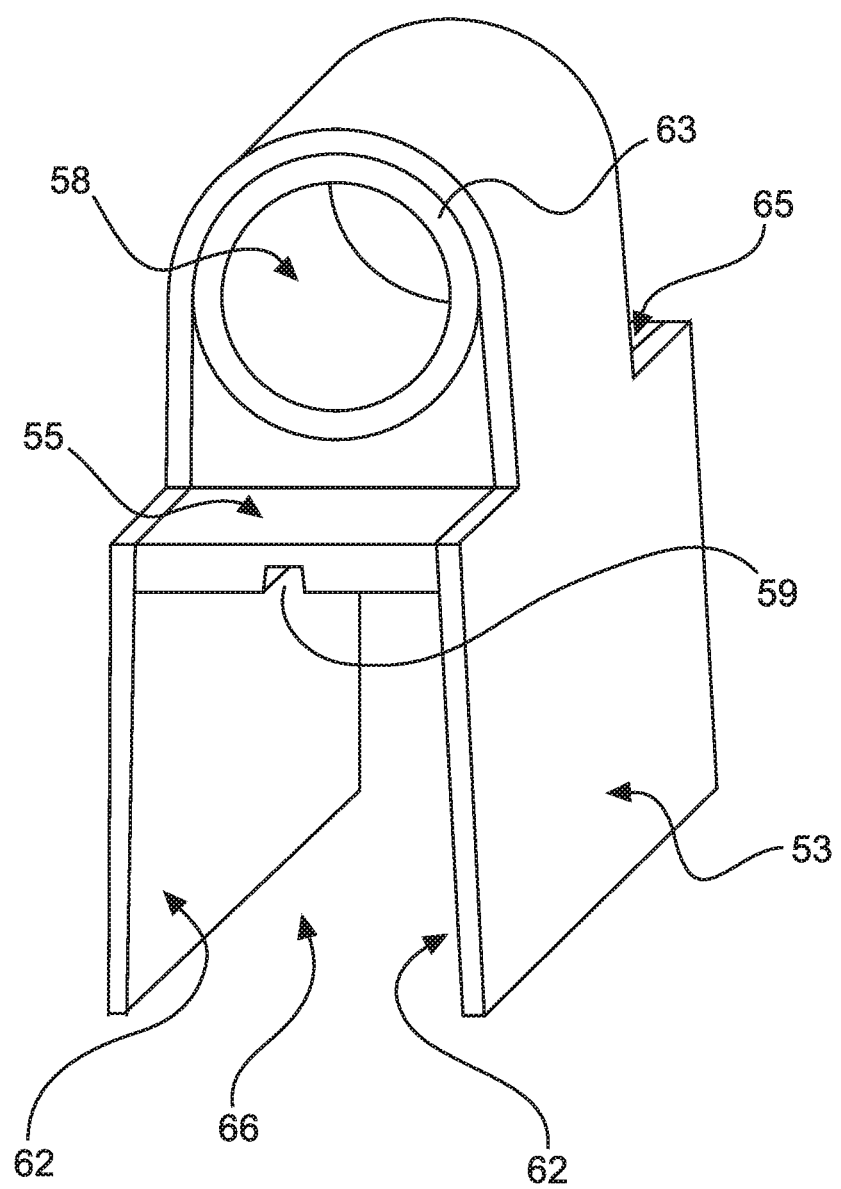
FIG. 5 shows a detail of a coupling means.

FIG. 5 shows a detail of a coupling means 65, with a shell element 53, into which a first coupling element 55 is latched. The shell element 53 in this case has two inner sides 62, which are parallel to each other and which form a receiving space 66 for receiving an inner blade shell and/or middle blade shell. The first coupling element has an indentation 59, which is provided to receive a sealing element. In addition, the first coupling element 55 has an opening 58, in which a second coupling element (not represented) such as, for example, an elongate, round rod can be inserted. Around the opening 58, the first coupling element 55 additionally has a projecting rim 63, as an exemplary embodiment of a flange, the outer cross section of which is greater than the cross section of the opening 58. When the shell element 53 is connected to a further shell element, this rim 63 bears against a rim of virtually the same shape. This avoids rubbing of the shell elements against each other.

Figure 6:
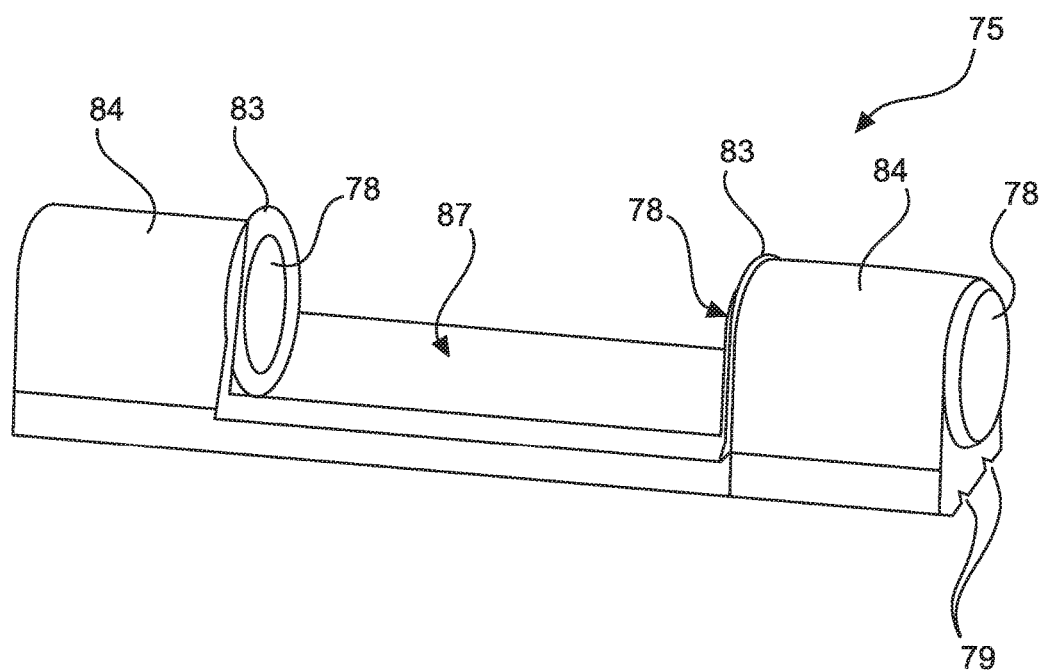
FIG. 6 shows a first coupling element.

FIG. 6 shows an exemplary embodiment of a first coupling element 75. The first coupling element 75 has two raised portions, provided in which, respectively, there is a circular opening 78, in which a second coupling element can be received. The first coupling element 75 additionally has two indentations 79, which are provided to receive a sealing element. Provided at the openings 78, respectively, there is an outer rim 83, which projects over the raised portions 84. Provided between the two raised portions 84 and the outer rims 83 there is a cavity 87, in which a corresponding counter-piece, i.e., a shell element to which the first coupling element is to be connected, can be received. The cavity 87 in this case has a semicircular shape, and is thus matched accordingly to the round raised portion of the shell element in bearing contact.

Such a first coupling element 75 in this case is preferably produced from plastic. When a shell element is inserted in the cavity 87, the outer rims 83 of the represented first coupling element 75 and of a further first coupling element bear against each other. Thus, advantageously, plastic bears against plastic.

The invention claimed is:

1. A trailing-edge segment of a wind-turbine rotor blade for increasing a profile depth of the rotor blade of a wind turbine, the trailing-edge segment comprising:
   at least one inner blade segment having an inner blade shell, and
   at least one middle blade segment having a middle blade shell,
   the at least one middle blade segment and the at least one inner blade segment being configured to be coupled to each other via a coupling means,
   the coupling means having at least one shell element having two inner sides that are parallel to each other and form a receiving space,
   the receiving space being configured to receive at least one of: the inner blade shell and the middle blade shell, and
   each of the two inner sides of the at least one shell element of the coupling means being configured to be coupled to at least one of: the inner blade shell and the middle blade shell in such a manner that a force acting upon the trailing-edge segment is introduced centrically into the coupling means.

2. The trailing-edge segment of a wind-turbine rotor blade according to claim 1, wherein the at least one shell element has a recess for receiving a first coupling element.

3. The trailing-edge segment of a wind-turbine rotor blade according to claim 2, wherein the first coupling element has an opening for receiving a second coupling element, wherein the first coupling element and the second coupling element are configured to couple the at least one inner blade segment to the at least one middle blade segment.

4. The trailing-edge segment of a wind-turbine rotor blade according to claim 3, wherein the second coupling element is an elongate body that is inserted in the respective opening of a plurality of first coupling elements such that the inner blade shell is coupled to the middle blade shell.

5. The trailing-edge segment of a wind-turbine rotor blade according to claim 2, wherein the first coupling element is a plastic material.

6. The trailing-edge segment of a wind-turbine rotor blade according to claim 2, wherein the first coupling element is latched into the recess of the at least one shell element.

7. The trailing-edge segment of a wind-turbine rotor blade according to claim 2, wherein the first coupling element has at least one indentation for receiving a sealing element, the sealing element being provided between the first coupling element and at least one of the inner blade shell and the middle blade shell.

8. The trailing-edge segment of a wind-turbine rotor blade according to claim 1, wherein the at least one shell element is produced from a fibrous composite material.

9. The trailing-edge segment of a wind-turbine rotor blade according to claim 8, wherein the fibrous composite material is glass-fiber-reinforced plastic.

10. The trailing-edge segment of a wind-turbine rotor blade according to claim 1, wherein the at least one shell element is U-shaped and/or forms a parallel loop.

11. The trailing-edge segment of a wind-turbine rotor blade according to claim 1, wherein the at least one inner blade segment and the at least one middle blade segment are configured to be coupled to each other in a form-fitting manner.

12. A wind-turbine rotor blade, comprising:
at least one outer blade segment that extends over an entire length of the wind-turbine rotor blade, and
at least one trailing-edge segment according to claim 1, wherein the at least one trailing-edge segment is coupled to the at least one outer blade segment.

13. The wind-turbine rotor blade according to claim 12, wherein the middle blade segment is connected to the at least one outer blade segment by a connecting side and configured to be coupled to the at least one inner blade segment by the coupling means.

14. A wind turbine, comprising:
a tower,
a nacelle,
a rotor, and
the at least one wind-turbine rotor blade according to claim 12 coupled to the rotor.

15. A coupling component for coupling at least one inner blade segment of a trailing-edge segment of a rotor blade of a wind turbine to at least one middle blade segment of a trailing-edge segment of a rotor blade of a wind turbine, the coupling component comprising:
at least first and second shell elements having a recess,
the first shell element configured to be connected to an inner blade shell of the at least one inner blade segment, and the second shell segment configured to be connected to a middle blade shell of the at least one middle blade segment,
the first and second shell elements having, respectively:
a first coupling element for inserting in the recess, the first coupling element having an opening, and
a second coupling element for inserting in the respective openings of the respectively first coupling element, such that the at least one inner blade segment and the at least one middle blade segment are configured to be coupled to each other, and
the first and second shell elements, each having two inner sides that are parallel to each other and are each prepared to introduce centrically into the coupling component a force acting upon the trailing-edge segment.

* * * * *